Figure 1:

No. 78,336.

PATENTED MAY 26, 1868.

A. P. STEPHENS.
COMPOSITE PIPE.

Witnesses:
Alfred Shedlock
John Rathbone Jr

Inventor;
A. P. Stephens
Per C. S. Kenwick
Atty.

United States Patent Office.

ANSON P. STEPHENS, OF BROOKLYN, NEW YORK.

Letters Patent No. 78,336, dated May 26, 1868.

IMPROVED COMPOSITE PIPE.

The Schedule referred to in these Letters Patent and making part of the same.

TO ALL WHOM IT MAY CONCERN:

Be it known that I, ANSON P. STEPHENS, of Brooklyn, in the county of Kings, and State of New York, have invented certain new and useful Improvements in Composite Pipes, and that the following is a full, clear, and exact description and specification of my said invention.

Previous to my invention, composite pipes have been manufactured of sheet metal and cement, by coating a plain cylinder or sleeve of the former on its interior and exterior with hydraulic cement. Pipes made in this mode are defective in several respects. In the first place, the smooth cylindrical surface of the sheet-iron pipe does not offer any material obstruction to the endwise movement of the cement when it is in the plastic state, and, as the cement is most conveniently applied when the pipes are in a vertical position, and the core and moulding-box are frequently removed while the cement is still in a green state, the cement frequently slips downwards, and accumulates at the lower end of the pipe, the result of which is that the pipes have to be plastered with cement at their upper ends, and pared off at their lower ends, by which operations the cost of manufacture is increased. Again, in such pipes the sheet metal opposes great resistance to a bursting force, and but little to an external compressing force, because the sheet metal, being quite thin, affords but slight resistance to unequal transverse pressures; hence large pipes frequently sag, and become oval when laid on their sides, and the unequal application of pressure externally, to which the pipes are subjected in use, frequently causes them to change their transverse form, and to crack longitudinally, the result of which is leakage at the seams and joints.

The object of my invention is to obviate the said defects, and it consists—

First, of the combination of a corrugated thin metal sleeve or pipe with a non-metallic lining. My invention consists, further, of the combination of a corrugated thin metal sleeve or pipe with a non-metallic covering; and lastly, of the combination of the corrugated thin metal sleeve or pipe with both a non-metallic lining and a non-metallic covering, so that the corrugated metal is entirely enclosed by or embedded in the non-metallic material.

In each of the above cases, the metallic portion of the composite pipe, although thin, not only opposes a resistance to a bursting force, but also opposes a powerful resistance to an external compressing force, so that the improved composite pipe is far superior to those hitherto made. Moreover, the corrugations of the metal, being in directions transverse to the length of the pipe, oppose a resistance to the endwise movement of the non-metallic material.

I prefer to use all parts of my invention in the same pipes, and the accompanying drawings represent a composite pipe embodying all parts thereof—

Figure 2:
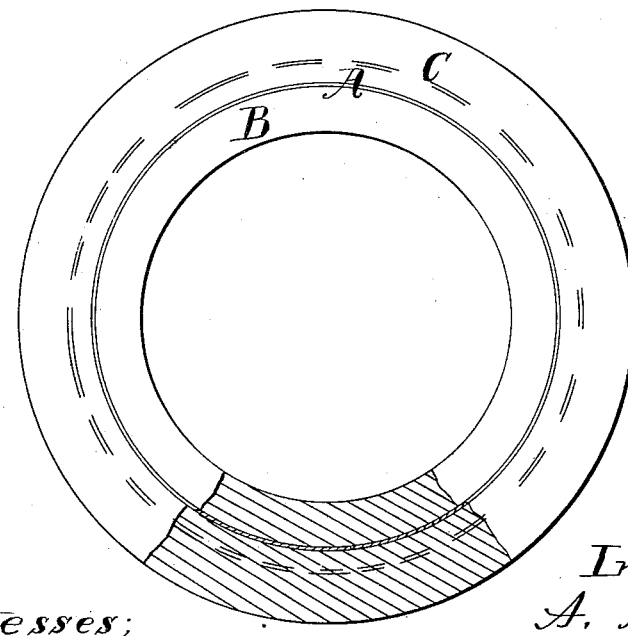

Figure 1 representing an elevation of a portion of such pipe, with some parts removed to show the internal construction, and with the profile of the metal sleeve represented by dotted lines, and Figure 2 representing a transverse section of the same.

In said pipe, the thin corrugated metal sleeve A is corrugated transversely to its length; its interior is lined with the non-metallic material B, and its exterior is covered with the non-metallic material C. The mode in which I have made composite pipes of this kind with success is to form the thin pipe or sleeve of sheet iron, in the same manner as stove-pipe is made, and to corrugate it by means of swaging-rollers. The corrugated sleeve thus formed is placed in a mould-box, whose interior is of the dimensions of the exterior of the pipe to be made, and a slightly tapering core, of the diameter of the bore of the pipe, is set up in the interior of the sleeve; then, hydraulic cement in a semi-fluid state is poured into the cavities between the sleeve and the core, and between the sleeve and the mould-box; or hydraulic cement mixed with sand and water is rammed into the said cavities. As soon as the cement has set, the core and mould-box are removed, and the pipe is permitted to dry; or the application of the cement may be performed substantially in the same manner as is practised in making the old composite pipe.

The thickness of the metal sleeve or pipe should be proportioned to the size of the composite pipe, and to the strength it is to possess, and the non-metallic material need not necessarily be hydraulic cement, or a compound of it, but may be adapted to the purpose for which the pipe is to be used.

These improved composite pipes may be so short as to answer for ring-connections for the ends of long pipes, and the non-metallic material may be applied, if found expedient, after the metallic sleeve is laid in the place in which it is to remain for use.

What I claim as my invention, and desire to secure by Letters Patent, is—

The combination of a thin corrugated metallic sleeve with a non-metallic lining, substantially as before set forth.

Also, the combination of a thin, corrugated metallic sleeve with a non-metallic covering, substantially as before set forth.

Also, the combination of a thin, corrugated metallic sleeve with both a non-metallic lining and a non-metallic covering, substantially as before set forth.

In testimony whereof, I have hereto set my hand, this 3d day of February, A. D. 1868.

ANSON P. STEPHENS.

Witnesses:
   WM. F. LETT,
   MELVIN STEPHENS.